Feb. 23, 1965     H. BROWNING     3,170,720
FLEXIBLE CONDUIT FOR PIPING AND THE LIKE
Filed Jan. 30, 1962     2 Sheets-Sheet 1
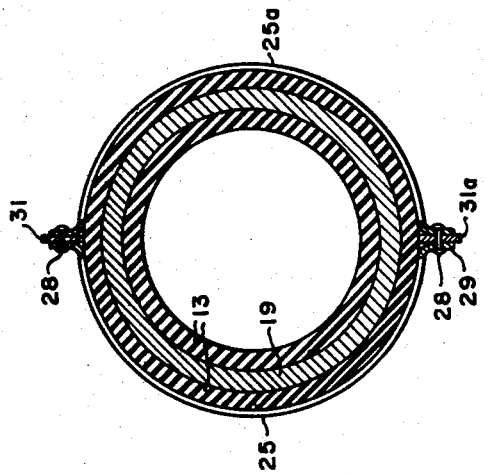
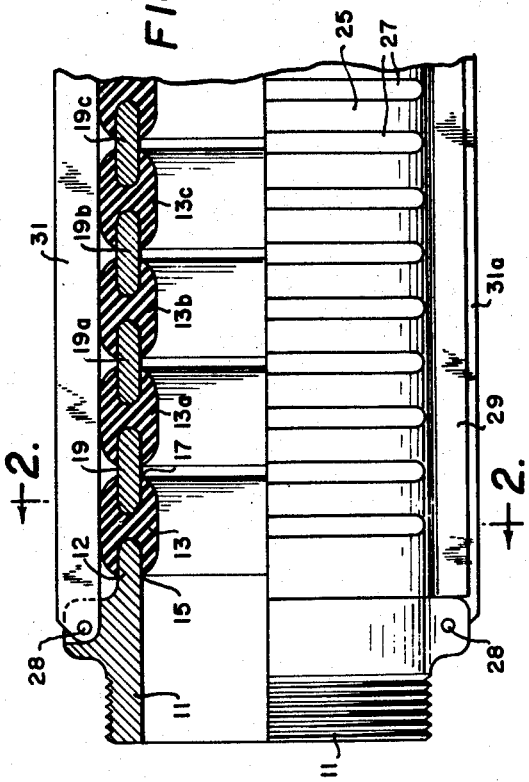
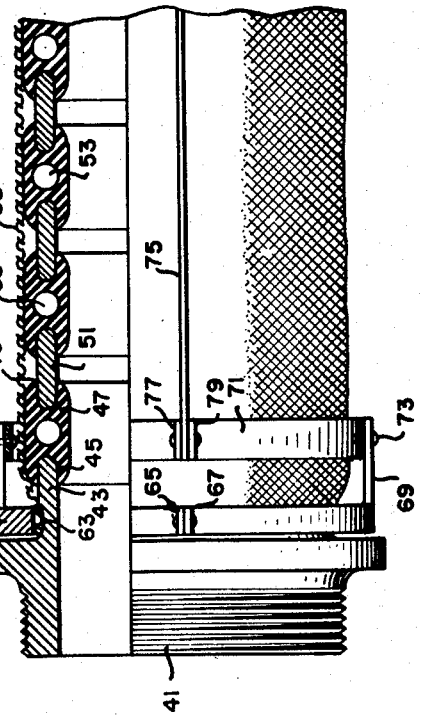
INVENTOR
HAROLD BROWNING
BY
ATTORNEY

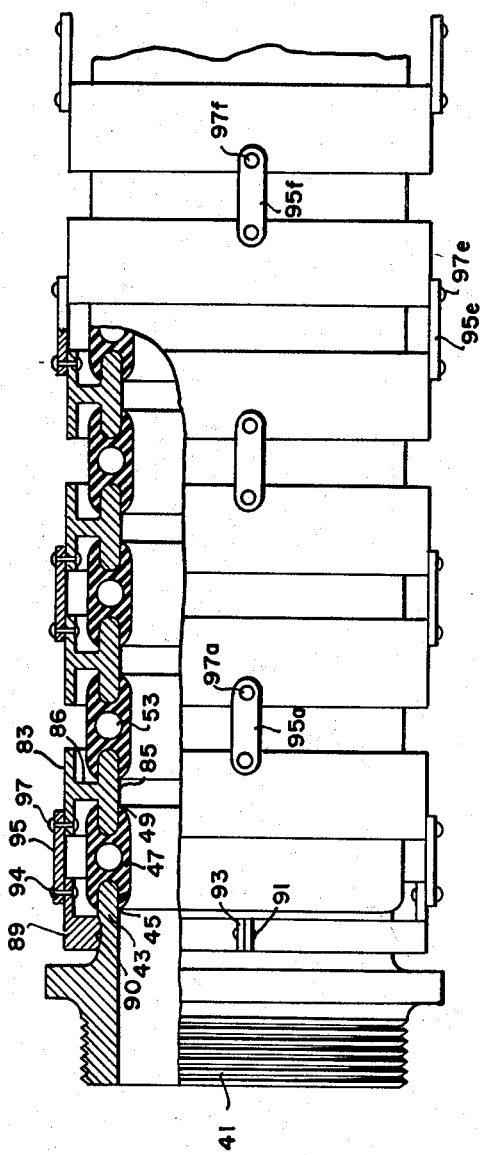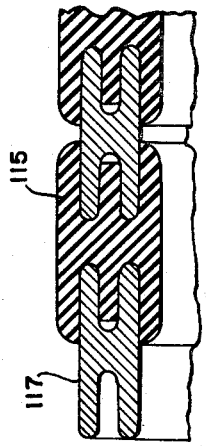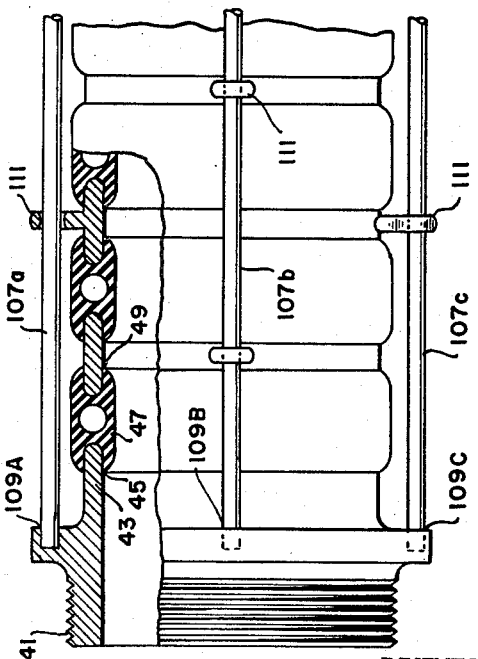

United States Patent Office 3,170,720
Patented Feb. 23, 1965

3,170,720
FLEXIBLE CONDUIT FOR PIPING AND
THE LIKE
Harold Browning, Hyattsville, Md., assignor to the United
States of America as represented by the Secretary of
the Navy
Filed Jan. 30, 1962, Ser. No. 169,979
3 Claims. (Cl. 285—114)
(Granted under Title 35, U.S. Code (1952), sec. 266)

The invention described herein may be manufactured and used by or for the Government of the United States of America for governmental purposes without the payment of any royalties thereon or therefor.

The present invention relates to flexible pipe couplings and more specifically to flexible pipe couplings adapted for use in high pressure systems.

An object of the present invention is to provide a flexible pipe coupling which is capable of omnidirectional or biplanar motion when installed in a piping system.

Another object is to provide a flexible pipe coupling which is capable of withstanding relatively high pressures.

A further object of the invention is to provide a flexible pipe coupling which is compact in size and light in weight.

In accordance with one form of the invention, a plurality of cylindrical metallic elements are joined together with a plurality of resilient cylindrical members to form a series of alternate metallic and resilient elements. The end elements of the coupling are provided with means for fastening the coupling to other pipe sections. The series combination of metallic elements and resilient members is provided with metallic restraining means for preventing the elements from pulling apart under pressure.

Other objects and many of the intended advantages of this invention will be readily appreciated as the same becomes better understood by reference to the following detailed description when considered in connection with the accompanying drawings wherein:

FIG. 1 is a partial plan view, partly in section, of an embodiment of the invention;

FIG. 2 is a sectional view of the device of FIG. 1 taken on the line 2—2 of FIG. 1, and looking in the direction of the arrows;

FIG. 3 is a partial plan view, partly in section, of a modification of the device illustrated in FIG. 1, and in which a protective wire mesh covers the entire pipe;

FIG. 4 is a view of another modification of the device along the lines of that shown in FIG. 1, and in which a series of gimbal joints are utilized;

FIG. 5 is a view of still another modification of the device along the lines of that shown in FIG. 1, in which wire ropes are utilized; and FIG. 6 is a partial sectional view of an alternate type of ring configuration which may be utilized in any of the embodiments shown in FIGS. 1, 3, 4, and 5, if desired.

Referring to FIG. 1, a threaded end nipple 11 forms one end of the flexible pipe coupling. A protrusion 12 of the threaded end nipple 11 is fitted into a chamber 15 of a resilient ring member 13. A stiff metallic or plastic ring member 19 is fitted into another chamber 17 of the resilient ring member 13 to form a flexible section. Similarly a series of stiff metallic or plastic rings 19a, 19b and 19c, etc. are interconnected by a series of resilient ring members 13a, 13b, and 13c, etc. so as to form a completely flexible coupling of any desired length. A threaded end nipple identical to the threaded end nipple 11 (not illustrated) is attached to the extreme end of the series of resilient members and metallic or plastic rings to complete the flexible pipe coupling. A flexible strengthening metallic sheath 25 encloses the entire flexible pipe coupling and is flexibly secured to the threaded end nipples by a rivet 28. The sheathing is formed in two semicylindrical portions which are also secured together by means of the rivet 28. The metallic sheathing 25 has formed therein a plurality of flexing slots 27 and metal flanges 29 running the entire length of the sheathing to strengthen it and to provide for fastening the portions of the sheathing to each other. A rib 31 (see FIG. 2) is also placed between the flanges 29 of the two semicylindrical sheaths halves to provide additional tensile strength when required.

In constructing the couplings, the individual elements may be first constructed as standard sections which are interchangeable and can be utilized in making any desired length of coupling. In assembly, an end element 11 has a resilient ring 13 pressed onto its protuberance 12. A stiff metallic or plastic ring 19 is then pressed into the opening 17 of ring 13. Similarly, resilient rings 13a, 13b, and 13c are assembled with stiff metallic or plastic ring elements 19a, 19b, and 19c. When the desired number of elements have been coupled together a second end nipple is fastened onto the other end. Reinforcing ribs 31, and 31a are then attached to the end nipples 11 and 11a and the flange portions of the semicircular sheathing elements by way of rivets 28. Ribs 31 and 31a act as restraining means and serve the function of preventing the elements from pulling apart once they have been placed in use. The pair of slotted semicircular sheathing elements are then welded to the reinforcing ribs so as to form an integral unit. The assembled unit is then ready for installation and is capable of flexing in directions transverse to the ribs.

Referring to the embodiment illustrated in FIG. 3, a threaded end nipple 41 has a protrusion 43 which is fitted into a chamber 45 of a resilient ring member 47, and a stiff metallic or plastic ring 51 fits into the other chamber 49 of the resilient ring so as to form a continuous segment of pipe in a manner similar to that shown in FIG. 1. A hole 53 in the resilient member 47 enables the resilient member to be highly flexible. The resilient members and relatively stiff metallic rings are connected in series until the desired length of the connector is obtained. A second threaded end nipple (not illustrated) is again connected to the other end of the series of resilient members and metallic rings and is identical to the end nipple 41. A wire mesh 59, which is woven into a cylinder, is slipped over the pipe coupling so as to cover the resilent members and ring elements. One end of the wire mesh 59 is clamped to the threaded end nipple 41 by way of clamp 61, which clamps the wire mesh in a groove 63 to prevent the mesh from being pulled from under the clamp. The clamp is held together by means of flanges 65 and a rivet 57. In addition, the clamp 61 carries an arm 69 which is connected to a pivotal ring 71 by way of a rivet 73.

A reinforcing rib 75 is attached to the flanges 77 of the pivotal ring 71 by way of a rivet 79. This joint is also pivotal so that the rib 75 can rotate about the rivet 79. A similar connection is made on the other end of the pipe coupling. Bolts or other fastening devices which permit pivoting may be used in place of the rivets, if desired.

The pipe coupling of FIG. 3 is constructed in a manner similar to that used in making the pipe coupling of FIG. 1 with the following differences:

Before the second threaded end nipple is placed into position the cylindrical woven wire mesh 59 is slipped around the series of resilient members and stiff metallic or plastic rings. The threaded end nipple is then attached to the last resilient member of the series, whereupon clamp 61 is attached to the threaded end nipples and fastened securely by rivets in order to securely hold the wire mesh 59 to the other elements of the pipe coupling.

A pivoting rivet 73 is set in an arm 69 and a pivotal ring 71 before the clamp 61 is attached to the threaded end nipple 41. Lastly a rivet 79 is inserted to attach flanges 77 and reinforcement rib 75 to complete the element. The other end of the flexible pipe coupling is assembled in a similar manner. The flexible pipe coupling is capable of being bent in the vertical and horizontal planes and can be considered to be capable of omnidirectional or multiplanar bending.

FIG. 4, illustrates still another embodiment of the instant invention. It is to be noted that common elements are designated by the same numerals as those used in FIG. 3. A threaded end nipple 41 is again connected to a resilient ring element 47 by means of a protruding portion 43 which fits into a chamber 45 of the resilient element. A metallic or plastic ring 83, consisting of an outer concentric metallic cylinder 84 and an inner metallic cylinder 85 interconnected by an integral metallic spacer or web 86, is provided for interconnecting each pair of resilient elements 47 of the coupling. One end of the metallic ring 85 fits into the chamber 49 of the resilient ring 47 and the other end of the metallic ring 85 is embedded in a similar chamber 45a of the next resilient member 47a.

A clamp 89 is clamped to the threaded end nipple 11 at a depressed portion 90 and is secured by a rivet 91 which passes through the flanges 93. The pivot rivet 94 secures a cylindrical metal element 95 thereto. The other end of the cylindrical metal element 95 is riveted to one end of the metallic cylinder 84 in a pivotal relationship thereto by means of a rivet 97. It is to be noted that the members 94, 95, 97 and 83 cooperate to form a gimbal joint. It is to be understood that only one end of the flexible pipe coupling is shown since the other end is identical in construction and function.

The construction of the device illustrated in FIG. 4 is similar to that of the device of FIGS. 1 and 2 and the parts which carry numerals common to those of FIG. 3 are identically assembled. The metallic cylinder 85 has one end pressed into cavity 40 of the resilient ring 47 and the resilient ring 47a is pressed onto the other end of the metallic cylinder. After the metallic elements and resilient rings are assembled the cylindrical connecting ring element 95 is riveted to the clamp 89 by means of a rivet 94 which permits the element to rotate relative to the clamp 89. Similarly, the cylindrical element 84 is riveted to a connecting ring 95 by a rivet 97 in a fashion which permits rotation of the stiff metallic or plastic ring 83 relative to the connecting ring 95. The other connecting rings 95a, b, c, etc. are connected to their respective adjacent elements in the same fashion, to thereby create a pipe coupling capable of omnidirectional or biplanar bending.

FIG. 5 is still another embodiment of the invention and similar elements performing similar functions are designated by the same identification numerals as those used in describing the preceding embodiments. The flexible pipe coupling as shown in FIG. 5 includes a series of wire reinforcing ropes 107A through D, spaced ninety degrees apart around the circumference of the flexible pipe coupling. The wire ropes or cable 107A through D are fixedly mounted into the threaded end nipple 41 in holes 109A through D respectively by welding them into their respective holes. The metallic coupling rings are provided with a series of guide rings 111 which prevent the wire ropes from rotating around the pipe. The coupling shown in FIG. 5 is assembled in a manner similar to that used in fabricating the embodiment shown in FIG. 1 with the additional step of welding or otherwise permanently affixing the wire ropes 107 into the sockets 109. Such other permanent affixing methods are well known in the art.

FIG. 6 shows a variation which is capable of being used in any of the embodiments shown in FIGS. 1, 3, 4, or 5, if desired. The elements 115 of FIG. 6 are resilient rings having E-shaped coupling faces. Elements 117 are the metallic rings which fit and interlock with elements 115 in series and have U-shaped coupling faces. Forming the rings in this manner adds considerable strength to the flexible pipe coupling. The coupling is therefore capable of withstanding a greater degree of pressure in systems where such added strength is necessary or desirable.

Obviously many modifications and variations of the present invention are possible in the light of the above teachings. It is, therefore, to be understood that within the scope of the appended claims the invention may be practiced otherwise than as specifically described.

What is claimed is:

1. A flexible conduit comprising, a first end means having one of its ends provided with means enabling it to be connected to another pipe, a second end means provided with means enabling it to be connected to another pipe, a plurality of resilient ring coupling means, each of said resilient ring coupling means containing a pair of annular cavities, each of said cavities being located at a respective end of said resilient ring coupling means, a plurality of non-resilient ring elements, said plurality of non-resilient ring elements being alternately coupled with said resilient ring coupling means to form a flexible fluidtight conduit with the end members being resilient coupling means, said non-resilient ring elements having their respective ends received within said cavities and resiliently gripped by the resilient ring coupling means, thereby forming a fluidtight joint, said first end means being connected to one end of the series of non-resilient ring elements and said resilient coupling means, the other end of the series of non-resilient ring elements and resilient coupling means being connected to said second end coupling means, whereby said resilient ring coupling means and said non-resilient ring elements form a fluidtight flexible pipe coupling.

2. A flexible pipe coupling comprising a first threaded end means, a second threaded end means, a plurality of resilient ring coupling means, each of said resilient ring coupling means containing a pair of annular cavities, each of said cavities being located at a respective end of said resilient ring coupling means, a plurality of non-resilient ring elements, said first threaded end means being connected in a fluidtight relationship with its end embedded in one end of one of said plurality of resilient coupling means, a first one of said plurality of non-resilient rings being connected in a fluidtight relationship with its end embedded in the other end of said first one of said plurality of resilient coupling means, a second resilient coupling means of said plurality of resilient coupling means being connected in a fluidtight relationship to said first one of said plurality of non-resilient rings, said non-resilient ring having its end embedded in one end of said second resilient coupling means, a second metallic ring of said plurality of non-resilient rings being connected in a fluidtight relationship with its end embedded in an end of said second resilient coupling means, a third resilient coupling means of said plurality of resilient coupling means being connected in a fluidtight relationship to said second non-resilient ring, non-resilient ring having its end embedded in an end of said third resilient coupling means, said second threaded end means being connected in a fluidtight relationship with its end embedded in an end of said third resilient coupling means, and restraining means for holding the flexible pipe coupling together, said restraining means being connected between said first threaded end means and said second threaded end means whereby said flexible pipe coupling is capable of withstanding forces which tend to pull it apart and cause it to leak.

3. A flexible pipe coupling as defined in claim 2 but characterized by having each cavity in the connecting end of said resilient coupling means in an E configuration and by having each connecting end of said non-resilient rings being metallic rings in a U configuration, whereby said resilient coupling means interlock tight with said metallic rings.

References Cited by the Examiner

UNITED STATES PATENTS

| | | | |
|---|---|---|---|
| 899,623 | 9/08 | Royer | 138—120 |
| 2,123,853 | 7/38 | Miller | 285—330 |
| 2,305,644 | 12/42 | Stone | 285—114 |
| 2,349,016 | 5/44 | Stephens | 138—120 |
| 2,394,270 | 2/46 | Swain | 285—114 |
| 2,514,059 | 7/50 | Hicks | 285—114 |
| 2,739,089 | 3/56 | Hageltorn | 285—330 |
| 2,748,803 | 6/56 | Guarnaschelli | 285—114 |
| 2,748,804 | 6/56 | Guarnaschelli | 285—114 |
| 2,898,940 | 8/59 | Cole | 285—114 |
| 3,006,662 | 10/61 | Katsuhara | 285—114 |
| 3,029,094 | 4/62 | Parlasca | 285—114 |

CARL W. TOMLIN, *Primary Examiner.*